R. M. Bartlett
Plant Protector

No. 74879          Patented Feb. 25, 1868.

Witnesses.
James H. Layman
Fred Backens

Inventor.
R. M. Bartlett

United States Patent Office.

ROBERT M. BARTLETT, OF STORRS TOWNSHIP, OHIO.

Letters Patent No. 74,879, dated February 25, 1868.

IMPROVED PLANT-PROTECTOR.

*The Schedule referred to in these Letters Patent and making part of the same.*

TO WHOM IT MAY CONCERN:

Be it known that I, ROBERT M. BARTLETT, of Storrs township, Hamilton county, Ohio, have invented new and useful Plant-Protector.

My invention relates to a cheap, simple, and effective device for protecting young and tender plants, such as beans, tomatoes, cucumbers, &c., from the injurious effects either of frost or heat; and the "protector" also serves to screen the plant from rain, hail, and other inclemencies of the weather. In the accompanying drawings—

Figure 1:
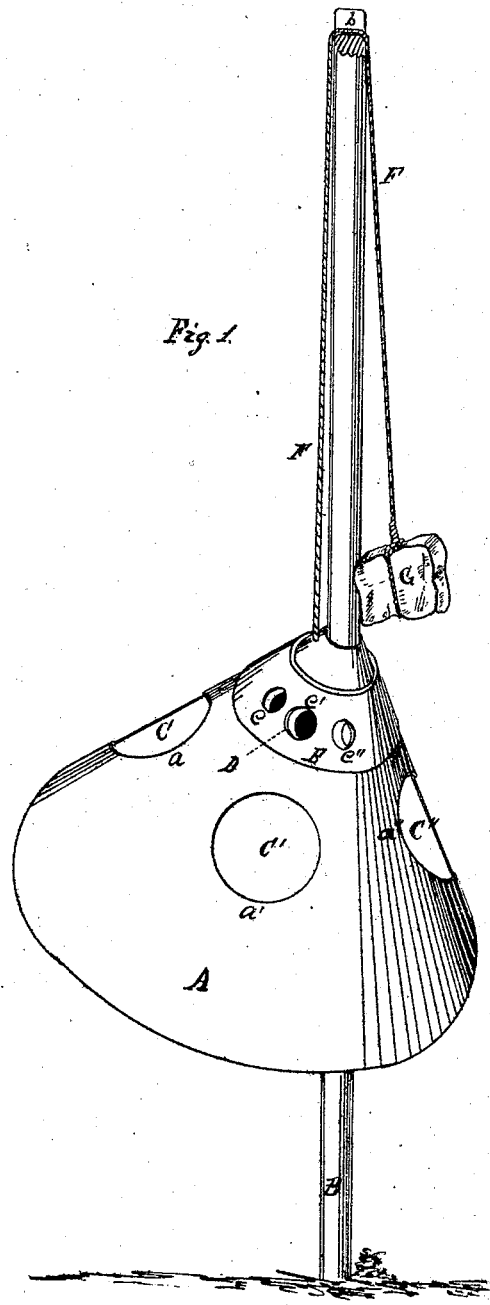
Figure 2:
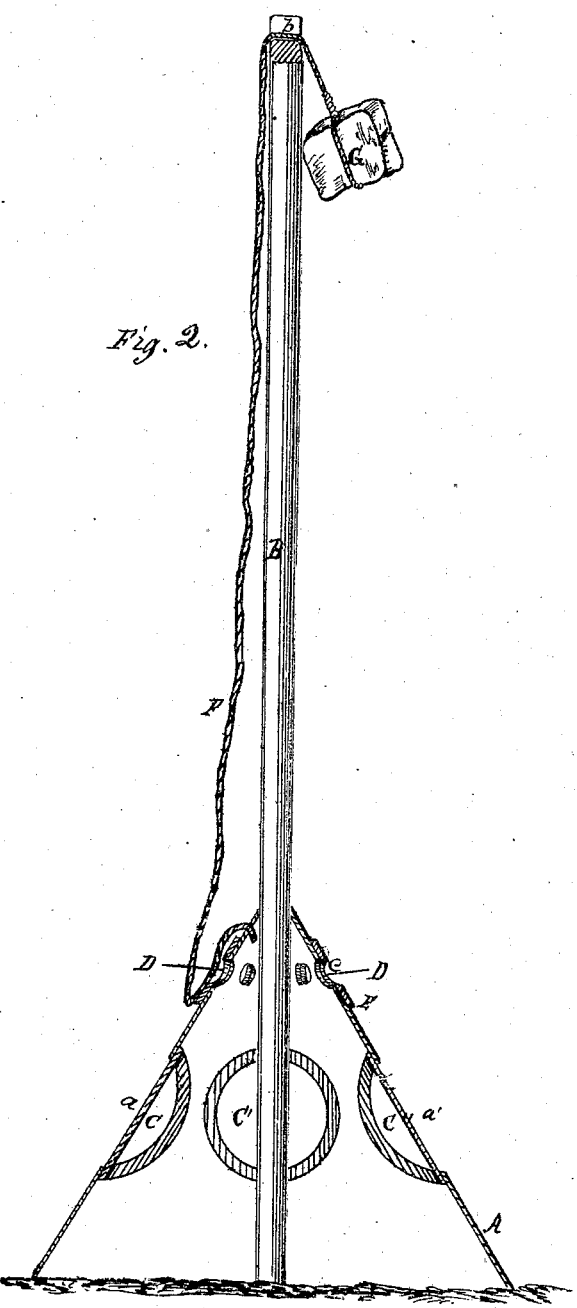

Figure 1 is a perspective view of my plant-protector, the hood being represented in its elevated position for the purpose of allowing the sunshine and air to have free access to the plant; and Figure 2 is an axial section of the "protector," when the hood is lowered to the ground so as to completely cover the plant.

In its preferred form my protector consists, mainly, of a conical hood, A, and supporting-pole B, and these members may be of any suitable dimensions according to the size and form of plant which is to be cultivated. The hood A may be constructed of pasteboard, thin wood, or any other suitable material, and it should be coated with varnish, paint, or coal-tar, to preserve it from the dampness of the ground and the changes of the weather. This hood, A, may be provided with one or more openings or "bull's-eyes," $a\ a'\ a''$, for the admission of light and warmth to the interior of the hood. The "bull's-eyes" are covered preferably with oiled paper, $C\ C'\ C''$, but if desired, muslin or ground or frosted glass may be substituted for the oiled paper. The paper is preferred on account of its cheapness, and its capacity of transmitting the rays of light in a mild, diffusive form, and also because it can be readily replaced when injured, besides which it can be made to conform to the shape of the hood, whether the same be conical, cylindrical, hemispherical, or otherwise. The upper portion of the hood is furnished with one or more ventilators, D, which can be opened by simply turning the cap E in either direction, and this cap is provided with apertures, $e\ e'\ e''$, corresponding in numbers, size, and position with the ventilators D, when the cap is rotated so as to bring these two sets of openings to one another, as seen in fig. 2. The hood is adapted to be raised clear of the plant, or to be lowered and retained at any point of elevation by means of the suspending-cord F and counterbalance G, one end of the cord being attached to the hood and the other to the said counterbalance. The cord F is confined within a kerf or notch, $b$, cut in the upper end of the pole B, and by slipping said cord through this, the counter-weight will maintain the hood at any position. This counterbalance is not necessary for the perfect working of the protector; it may be dispensed with, and the cord may be wound around the pole, but the counter-weight will be found to be the most rapid means of securing the hood at any height above the plant. The hood, for night protection merely, need not have the bull's-eyes, and would answer very well for temporary protection from cold, &c., during the day. The cord may be attached to the hood at one point, as shown in the drawings, or the lower end of the cord may be forked and united to the hood at two diametrically opposite points, and when thus suspended the hood will hang perfectly level and not inclined, as represented. The inclined position is preferable when the plants are located at one side of the pole, but when they surround it, the hood should hang level, or, in other words, it should project alike on all sides of the pole, so as to shelter the plant equally.

By the use of this invention, corn, beans, melons, tomatoes, &c., may be planted with safety from three to five weeks earlier than out-door planting would admit of.

When the plant or seed is first put in the ground, the hood must be lowered to the earth, as shown in fig. 2, and care should be taken that it fits close to the ground. A little fine dirt, saw-dust, tan-bark, or chaff, put around the bottom of the hood, to more effectually exclude the cold atmosphere, would be beneficial. In this condition the hood should remain so long as the plants within are not crowded for room, after which it should be raised gradually from time to time, as the plants grow; this will harden them, and prepare them (when the proper time comes) for the removal of the hood. In order that the plants receive sufficient amount of moisture, &c., the hood should be removed from time to time during the warm rains, &c.

In extreme hot weather the hood will be very useful in protecting plants, especially transplanted ones, from the extreme heat of the sun. The sunshine, passing through the bull's-eyes, keeps the ground warm, and the ventilators being closed, so as to retain the heat and moisture, whatever is within will commence growing at once, and as the young plant grows, the hood may be lifted gradually, and be finally removed to allow the plant to mature and ripen.

It will be perceived that these hoods, when done with for the season, are capable of being nested one within another, so as to occupy very little stowage room. I have rendered these hoods both rigid and impervious by dipping them into melted sealing-wax.

I claim herein as new, and of my invention—

1. A plant-protector, consisting of the following devices, to wit: A hood, A, of any suitable shape, when used in connection with the pole B and suspending-cord F, the whole being arranged and operating substantially as herein described and for the purpose set forth.

2. In combination with the elements A $a\ a'\ a''$, C C' C'', B, and F, I also claim the ventilator D and cap E $e\ e'\ e''$, as and for the purpose explained.

3. The conical hood A, having one or more lighted openings or "bull's-eyes," C, and adapted for suspension to a stick or pole, in the manner substantially as set forth.

In testimony of which invention, I hereunto set my hand.

ROBERT M. BARTLETT.

Witnesses:
    GEO. H. KNIGHT,
    JAMES H. LAYMAN.